(12) United States Patent
Gallant

(10) Patent No.: US 10,292,346 B2
(45) Date of Patent: May 21, 2019

(54) STACKABLE MODULAR ROTATABLE GARDENING SYSTEM

(71) Applicant: Roto-gro Inc., Caledon (CA)

(72) Inventor: Jim Gallant, Caledon (CA)

(73) Assignee: Roto-gro Inc., Bolton, Ontario (CA)

( * ) Notice: Subject to any disclaimer, the term of this patent is extended or adjusted under 35 U.S.C. 154(b) by 430 days.

(21) Appl. No.: 14/883,156

(22) Filed: Oct. 14, 2015

(65) Prior Publication Data

US 2017/0099792 A1 Apr. 13, 2017

(30) Foreign Application Priority Data

Oct. 13, 2015 (CA) .................................... 2908184

(51) Int. Cl.
| | | |
|---|---|---|
| *A01G 31/04* | (2006.01) | |
| *A01G 31/06* | (2006.01) | |
| *A01G 7/02* | (2006.01) | |
| *A01G 7/04* | (2006.01) | |

(52) U.S. Cl.
CPC .............. *A01G 31/06* (2013.01); *A01G 7/02* (2013.01); *A01G 7/045* (2013.01); *A01G 31/047* (2013.01); *Y02P 60/216* (2015.11)

(58) Field of Classification Search
CPC ...... A01G 31/06; A01G 31/047; A01G 31/02; A01G 7/02; A01G 7/045; Y02P 60/216
See application file for complete search history.

(56) References Cited

U.S. PATENT DOCUMENTS

| | | | | |
|---|---|---|---|---|
| 3,233,146 | A * | 2/1966 | Vacha | A01G 7/045 |
| | | | | 315/113 |
| 4,258,501 | A * | 3/1981 | Brown | A01G 31/047 |
| | | | | 47/16 |
| 4,314,646 | A * | 2/1982 | Purnell | A47G 7/045 |
| | | | | 211/113 |
| 5,515,648 | A * | 5/1996 | Sparkes | A01G 7/045 |
| | | | | 47/65 |
| 6,840,007 | B2 * | 1/2005 | Leduc | A01G 31/02 |
| | | | | 47/48.5 |
| 7,134,240 | B1 * | 11/2006 | Neal | A01G 31/02 |
| | | | | 47/60 |
| 7,181,886 | B2 * | 2/2007 | Bourgoin | A01G 31/047 |
| | | | | 47/59 R |
| 7,401,437 | B2 | 7/2008 | Dumont | |
| 7,488,098 | B2 * | 2/2009 | Dumont | A01G 9/1423 |
| | | | | 362/429 |

(Continued)

FOREIGN PATENT DOCUMENTS

| | | |
|---|---|---|
| CA | 2343254 A1 | 7/2001 |
| CA | 2396317 A1 | 11/2002 |

(Continued)

*Primary Examiner* — Joshua D Huson
(74) *Attorney, Agent, or Firm* — The Webb Law Firm

(57) ABSTRACT

This invention relates to a modular rotatable gardening system, comprising a modular main frame supporting a drum for growing plants. This modular rotatable gardening system can be stacked on top of one or more other modular rotatable gardening systems, and also combined in-line. The modular rotatable gardening system may additionally comprise a modular hot air removal ductwork, and may additionally comprise a $CO_2$ delivery system.

7 Claims, 11 Drawing Sheets

(56) References Cited

U.S. PATENT DOCUMENTS

| | | | | |
|---|---|---|---|---|
| 7,559,173 B2* | 7/2009 | Brusatore | ............ | A01G 31/047 47/59 R |
| 7,665,244 B2* | 2/2010 | Jesness, III | ......... | A01G 27/006 47/39 |
| 7,730,663 B2* | 6/2010 | Souvlos | ............... | A01G 31/047 47/62 C |
| 7,748,165 B2* | 7/2010 | Santoli | .................. | A01G 31/02 47/61 |
| 8,322,011 B2* | 12/2012 | Hargreaves | ............ | A01G 7/045 29/428 |
| 8,371,459 B1* | 2/2013 | Rekhels | ................... | A47F 5/02 108/139 |
| 9,010,018 B2 | 4/2015 | Wiggins et al. | | |
| 9,043,962 B2 | 6/2015 | Trofe | | |
| 2002/0144461 A1* | 10/2002 | Marchildon | ......... | A01G 31/047 47/65.5 |
| 2004/0060491 A1* | 4/2004 | Leduc | .................... | A01G 31/02 111/105 |
| 2004/0237396 A1* | 12/2004 | Castillo | ................... | A01C 1/02 47/61 |
| 2005/0011119 A1* | 1/2005 | Bourgoin | ............ | A01G 31/047 47/61 |
| 2007/0141912 A1* | 6/2007 | Dumont | ............... | A01G 9/1423 439/620.02 |
| 2009/0145870 A1* | 6/2009 | Tagawa | ................. | A01G 31/06 211/190 |
| 2009/0151244 A1* | 6/2009 | Jesness, III | .......... | A01G 27/006 47/65 |
| 2009/0165373 A1* | 7/2009 | Souvlos | ............... | A01G 31/047 47/65 |
| 2011/0232190 A1* | 9/2011 | Pindus | ................... | A01G 31/02 47/62 A |
| 2012/0167460 A1* | 7/2012 | Omidi | .................... | A01G 9/023 47/65.7 |
| 2012/0287617 A1* | 11/2012 | Mekhtarian | ............ | A01G 7/045 362/228 |
| 2013/0180172 A1 | 7/2013 | Silverberg | | |
| 2014/0165458 A1* | 6/2014 | Wang | ....................... | A01G 1/04 47/1.1 |
| 2014/0165468 A1* | 6/2014 | Roeser | ..................... | A01G 9/12 47/62 R |
| 2014/0318012 A1 | 10/2014 | Fujiyama | | |
| 2015/0208592 A1* | 7/2015 | Marchildon | ......... | A01G 31/047 47/79 |

FOREIGN PATENT DOCUMENTS

| | | |
|---|---|---|
| CA | 2401737 A1 | 12/2002 |
| CA | 2421389 A1 | 9/2004 |
| CA | 2460465 A1 | 9/2004 |
| CA | 2431523 A1 | 12/2004 |

\* cited by examiner

STACKABLE MODULAR ROTATABLE GARDENING SYSTEM

CROSS-REFERENCE TO RELATED APPLICATION

This application claims priority to a recently filed Canadian Patent Application CA 2,908,184, entitled Stackable Modular Rotatable Gardening System, filed Oct. 13, 2015, of which has not yet been assigned an application number.

FIELD OF THE INVENTION

This invention relates to hydroponic gardening and more particularly to a stackable modular rotatable gardening system.

BACKGROUND OF THE INVENTION

Indoor gardening systems can enhance growing conditions or extend a growing season through controlling the light, temperature, nutrients and water conditions for plants. Plants can be grown indoors in dirt media or hydroponically either in solution or solid media, such as, sand, gravel or rockwool. Given that trays of plants in either dirt or hydroponic media on tables take up a lot of square space just like fields of crops, and indoor spaces can be costly, various space saving measures have been developed, including in rotatable drums. Rotating gardening systems are described in U.S. patent application Ser. No. 13/352,159 (publication No. 20130180172) entitled Rotating Plant Containing Module with Self-Contained Irrigation System; U.S. Pat. No. 7,401,437; and Canadian patent Nos. 2,421,389, 2,431,523, 2,460,465, 2,401,737, 2,396,317 and 2,343,254. Rotary drum growing systems may array plants in growing trays rotating around a light source.

These indoor gardening systems require adaptations to deliver light, nutrients, water, and ventilation to the plants, see for example, U.S. Pat. No. 9,010,018 for a Growth Chamber Carousel and U.S. Pat. No. 9,043,962 for Modular Self-Sustaining Planter System, and U.S. patent application Ser. No. 14/331,483 (publication No. 2014/0318012) for Plant Growing Device.

In an example of a rotating drum hydroponic growing system, a drum rotates around a light and rows of growing trays line the interior of the drum. Seedlings are placed in the trays such that the growing plants face the light. As the drum rotates, the plants rotate and while always facing the light, they are sometimes upside down, which means that watering and nutrient delivery is different from a potted plant on a table, and must be adapted. Present rotatable gardening systems can still take up considerable space, particularly when the apparatus to support the growing system has a large footprint.

SUMMARY OF THE INVENTION

In an embodiment of the present invention, there is a modular rotatable gardening system, comprising a drum in which plants can be grown and a modular main frame, said drum suspended through drum attachment means within a modular main frame such that the drum is rotatable. The modular rotatable gardening system may additionally comprise a hot air removal system to circulate air heated by the growing lights, and may additionally comprise a $CO_2$ delivery system to deliver $CO_2$ to the plants.

In a further embodiment of the present invention there is a stacked modular rotatable gardening system comprising more than one modular rotatable gardening system stacked on top of each other from lower to higher, wherein each modular main frame comprises a top end and a bottom end, and the top end of the modular main frame of a lower modular rotatable gardening system is attached by attachment means to the bottom end of the modular main frame of a higher modular rotatable gardening system.

In a further embodiment of the present invention there is an in-line stacked modular rotatable gardening system comprising a first stacked modular rotatable gardening system beside a second stacked modular rotatable gardening system, wherein the main frames of the first stacked modular rotatable gardening system are connected by connecting means to the main frames of the second stacked modular rotatable gardening system.

In a further embodiment of the present invention there is an in-line modular rotatable gardening system comprising a first modular rotatable gardening system beside a second modular rotatable gardening system, wherein the main frame of the first modular rotatable gardening system is connected by connecting means to the main frame of the second modular rotatable gardening system.

BRIEF DESCRIPTION OF THE DRAWINGS

These and other aspects of the present invention will be apparent from the brief description of the drawings and the following detailed description in which:

FIG. 7a is a perspective view and FIG. 7b is a front or back view of a main frame and drums, of a stacked modular rotatable gardening system of an embodiment of the present invention.

DETAILED DESCRIPTION OF THE INVENTION

In an embodiment of the present invention there is provided a modular rotatable gardening system, comprising a modular main frame supporting a drum in which plants can be grown. In a further embodiment of the present invention, modular rotatable gardening systems can be stacked on top of each other, and also combined in-line beside each other. In a further embodiment of the present invention, the modular rotatable gardening system comprises a modular hot air removal ductwork, and may additionally comprise a $CO_2$ delivery system.

Figure 1:
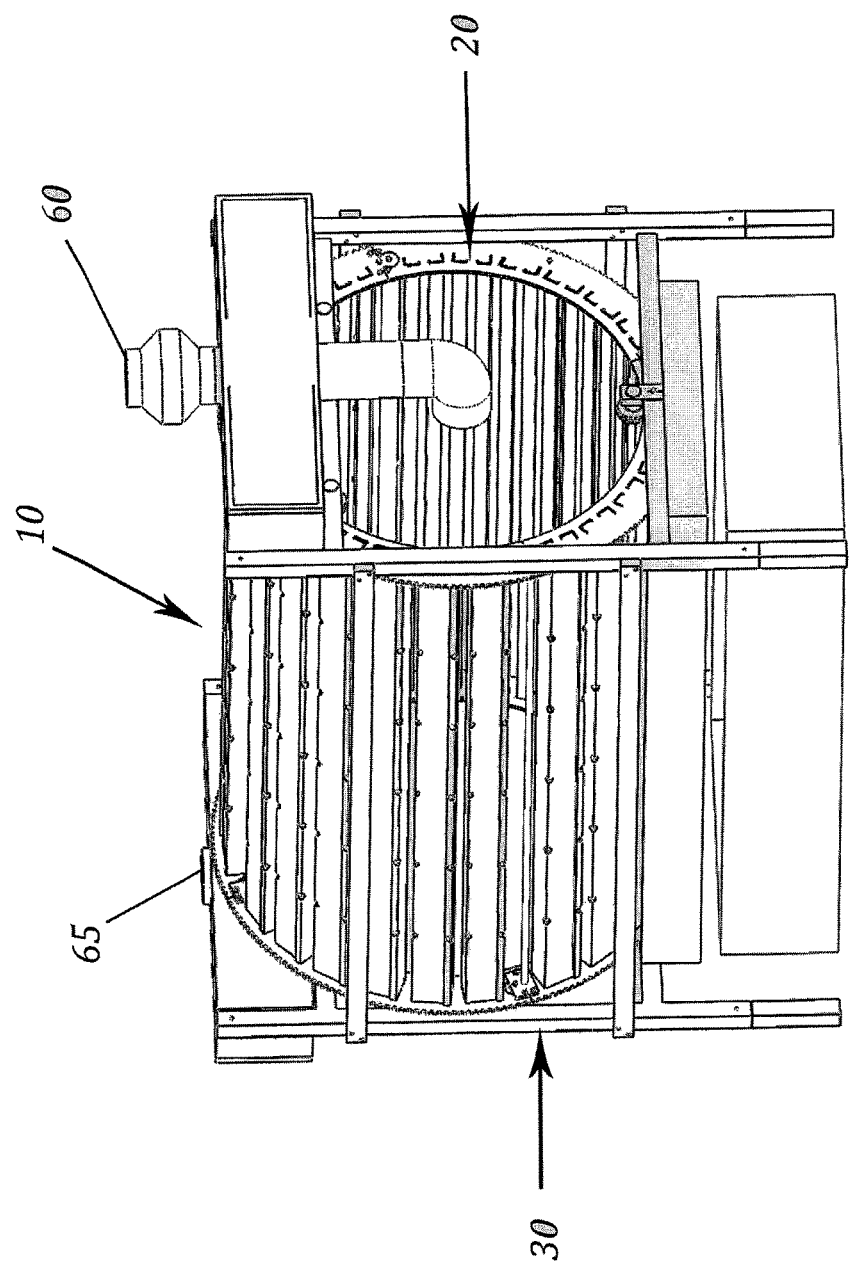
FIG. 1 is a perspective view of a modular rotatable gardening system of an embodiment of the present invention.

In FIG. 1 there is shown a modular rotatable gardening system 10 of an embodiment of the present invention in which a main frame 30 supports a drum 20, said drum comprising a support ring 35 at either end and growing trays 40 circumferentially arranged in substantially parallel rows and held in position by the support rings 35 at either end of each of said trays 40. Ring attachment means 150 on the outer edge of the support ring 35 may be used to enable the drum 20 to rotate. Lights are held in place in substantially the center of the drum 20 in a glass tube 45 supported by supporting air duct 50, which is part of a hot air removal system 42 which draws hot air, from the radiant heat of the lights, through a modular duct system and away.

Figure 2:
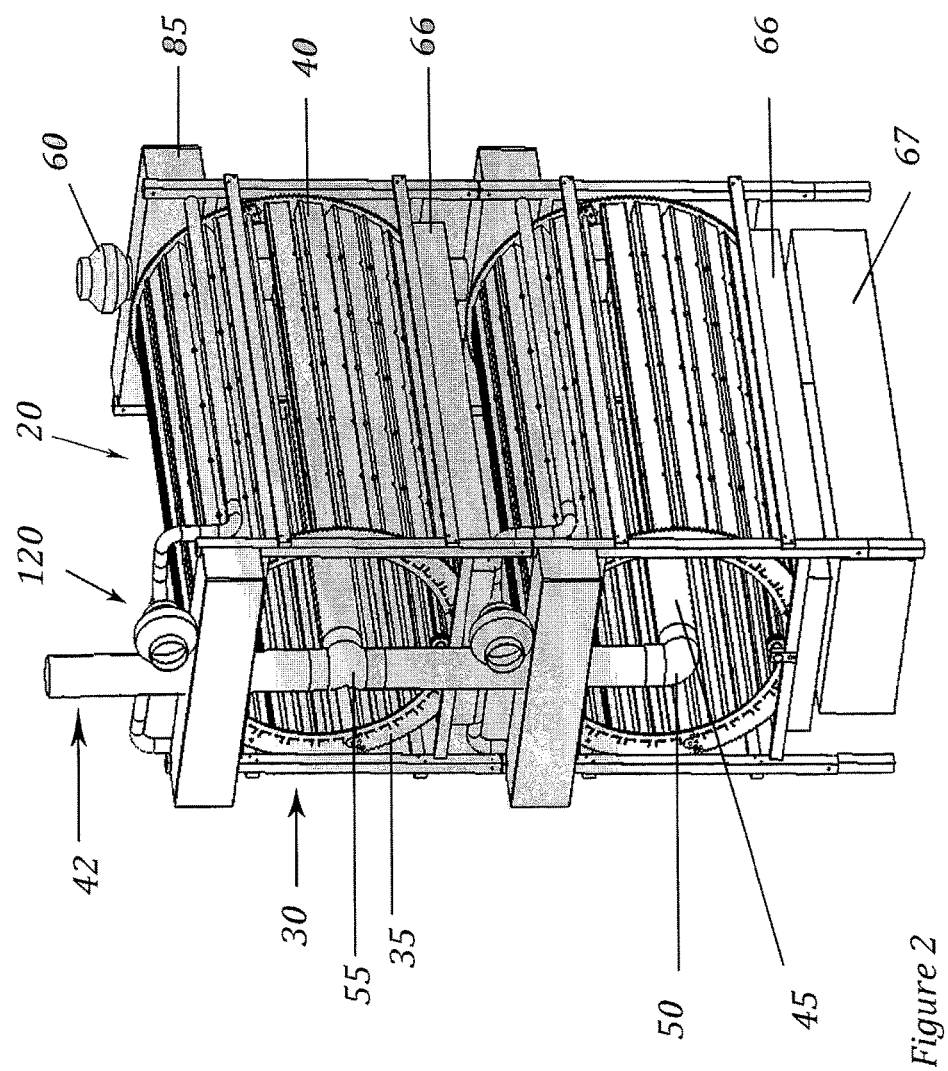
FIG. 2 is a perspective view of the modular rotatable gardening system of FIG. 1 stacked on top of a second modular rotatable gardening system, in an embodiment of the present invention, referred to as a stacked modular rotatable gardening system.

In FIG. 2 there is shown the modular rotatable gardening system 10 from FIG. 1 with a further modular rotatable gardening system 10 stacked on top. The modular main frame allows stacking of modular rotatable gardening systems, as does the modular duct system.

Figure 5:
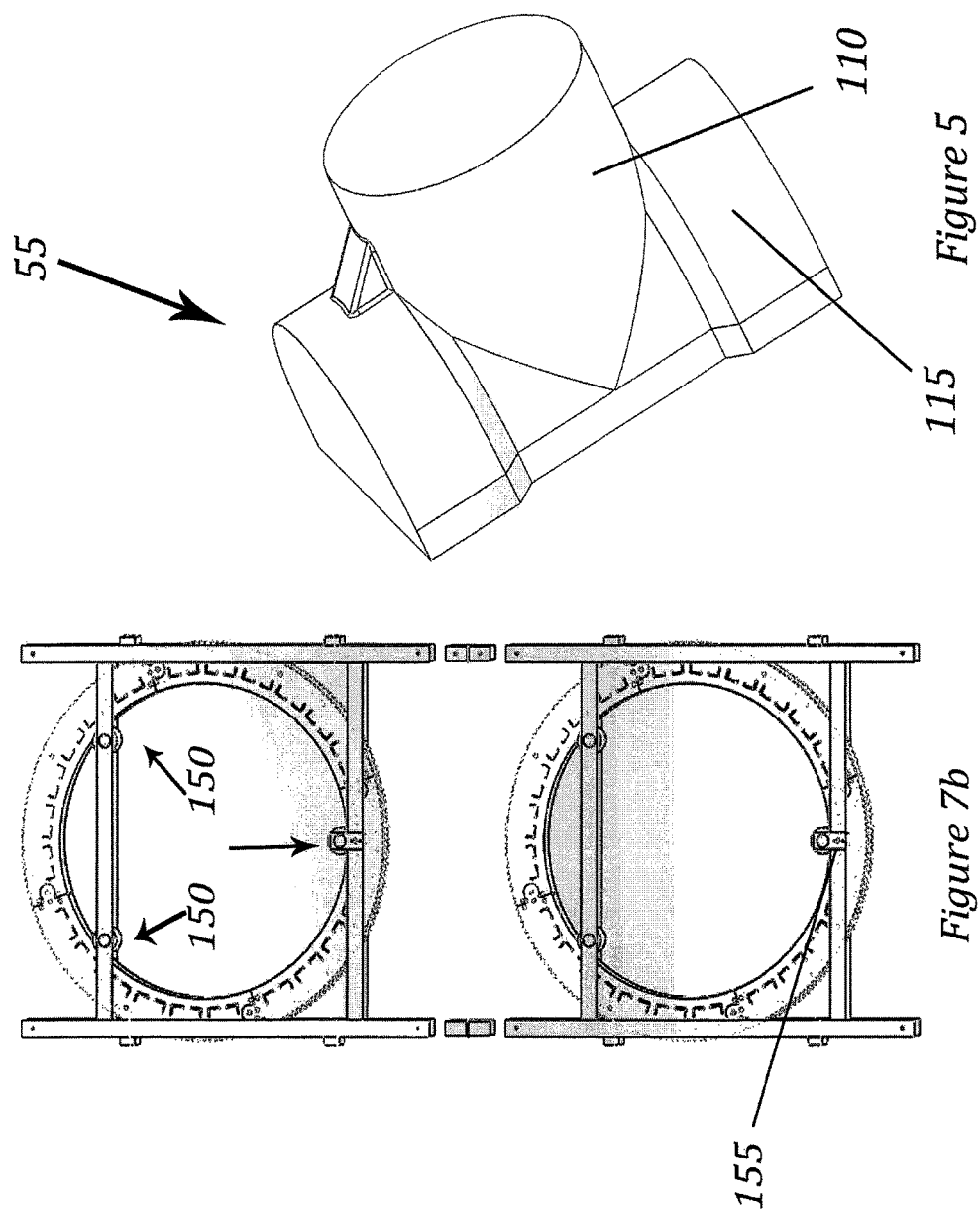
FIG. 5 is a perspective view of a T-joint of an air duct of an embodiment of the present invention
Figure 6:
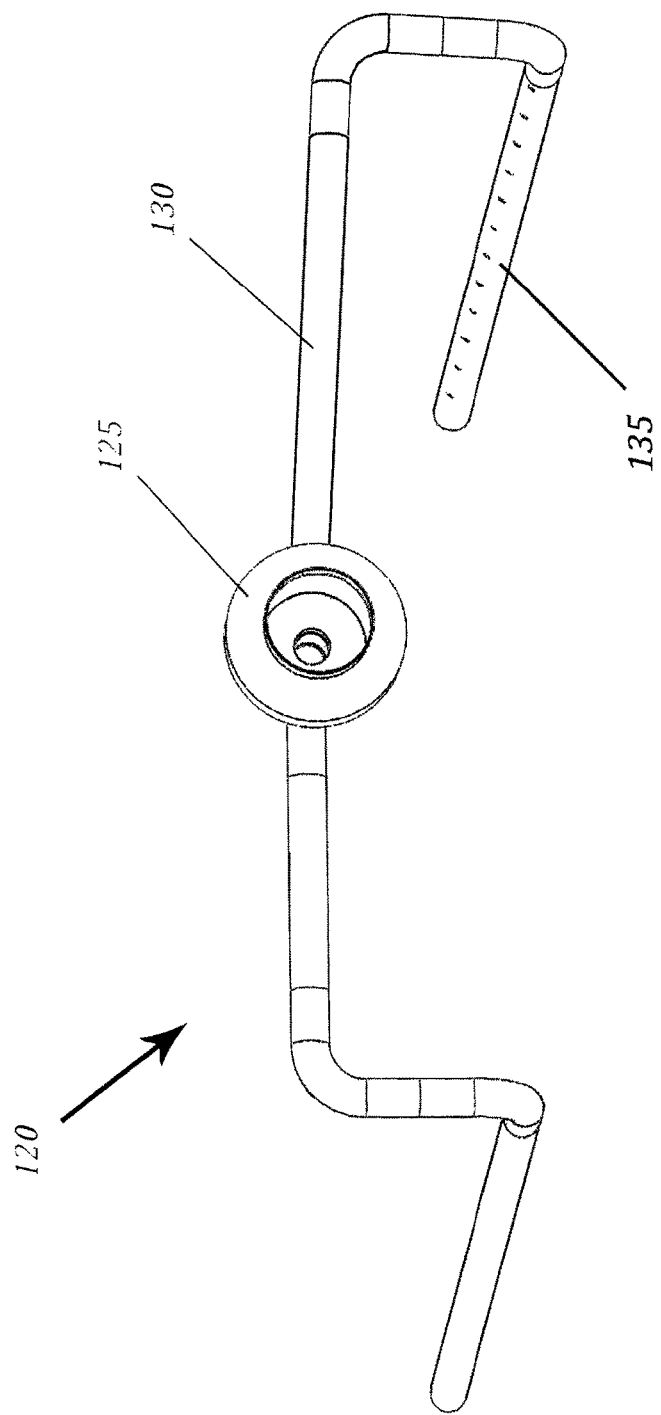
FIG. 6 is a perspective view of a $CO_2$ delivery system of an embodiment of the present invention.

When systems are stacked from lower to higher, a modular duct system of higher modular rotatable gardening system 10 is adapted with a T-duct 55 in place of the supporting air duct 50, which T-duct 55 is shown in more detail in FIG. 5. The modularity allows for the intake and outlet of air through the highest modular rotatable gardening system. In the embodiment of the present invention the duct work passes through the electrical box 85 for space saving and aesthetic appeal, but it is understood that other configurations are also contemplated.

A duct system for a stacked modular rotatable gardening systems stacked on top of each other may need to be modified if more than three modular rotatable gardening systems are stacked on top of each other, to ensure hot air is removed adequately. For example while three modular rotatable gardening systems stacked on top of each other may utilise six inch diameter ducts, six systems stacked on top of each other may utilise eight inch diameter ducts. In embodiments with multiple modular rotatable gardening systems stacked on top of one another the main frame may need to be strengthened or bolstered in order to support multiple drums.

As seen in FIG. 1, a single modular rotatable gardening system 10 has an in-line fan 60 and an outlet duct 65, but when a further modular rotatable gardening system is stacked on top, as seen in FIG. 2, the first (and bottom) modular rotatable gardening system does not require its own in-line fan 60 and outlet duct 65 since these are available through the highest modular rotatable gardening system. When modular rotatable gardening systems are stacked, one or more dampers for regulating the flow of air may be used in the duct work to ensure that air flow is evenly spread, for example, when three systems are stacked on top of each other a damper may be fully open for the lower system, partially closed to restrict air flow for the middle system, and three quarters closed to restrict air the most on the highest system. If the in-line fan 60 was located at the bottom rather than the top, the opposite damper system would be utilised to ensure that air would move well through the stacked systems for removing hot air.

As seen in FIG. 2, the upper reservoir 66 is positioned below the drums 20 such that when rotated, the plants (not shown) in trays 40 receive nutrients and water by passing through the upper reservoir 66. With a single, stacked or triple decker modular rotatable gardening system, the nutrient solution can be fed from and drained back into the main reservoir 67 from the one, two or three upper reservoirs by way of interconnecting hose (not shown). The upper reservoir 66 and main reservoir 67 can be made of ABS plastic or preferably another material that doesn't rust or leak.

A carbon dioxide ("$CO_2$") delivery system 120 is shown although there is $CO_2$ in the air naturally, in a further embodiment of the present invention to enable $CO_2$ delivery to plants. Although plants can access $CO_2$ from the surrounding air or from floor fans or wall fans, the $CO_2$ delivery system 120 is effective and space efficient. Fans (for example on the floor or built into the building housing the present invention) could be used to help deliver $CO_2$; however, fans on the floor take up space and both floor fans and built in building fans lack the proximity of the $CO_2$ delivery system to the plants.

Figure 3A:
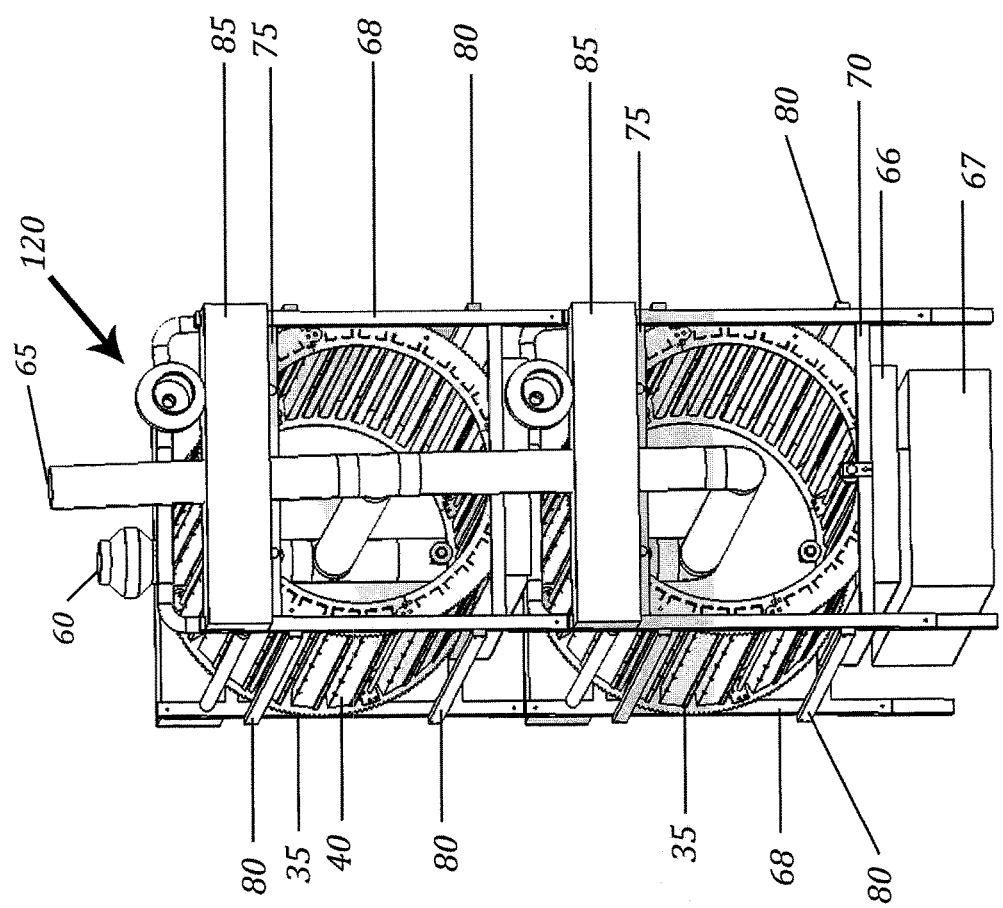
FIG. 3a is a perspective view of the stacked modular rotatable gardening system of FIG. 2.

As seen in FIG. 3a, the main frame 30 comprises uprights 68, a first cross bar 70, a second cross bar 75, and side bars 80. The lower most of the modular rotatable gardening system may have feet 181. The main frame 30 can be made of powder coated aluminum, and again a material that doesn't rust or leak and is strong enough for the weight of the drums 20 is preferred. The second cross bar 75 supports an electrical box 85. When in stacked format the electrical boxes of the upper and lower (and middle, if applicable) systems may be connected via wiring harness and connectors, and the main electric feed can come from the uppermost electrical box 85.

Figure 3B:
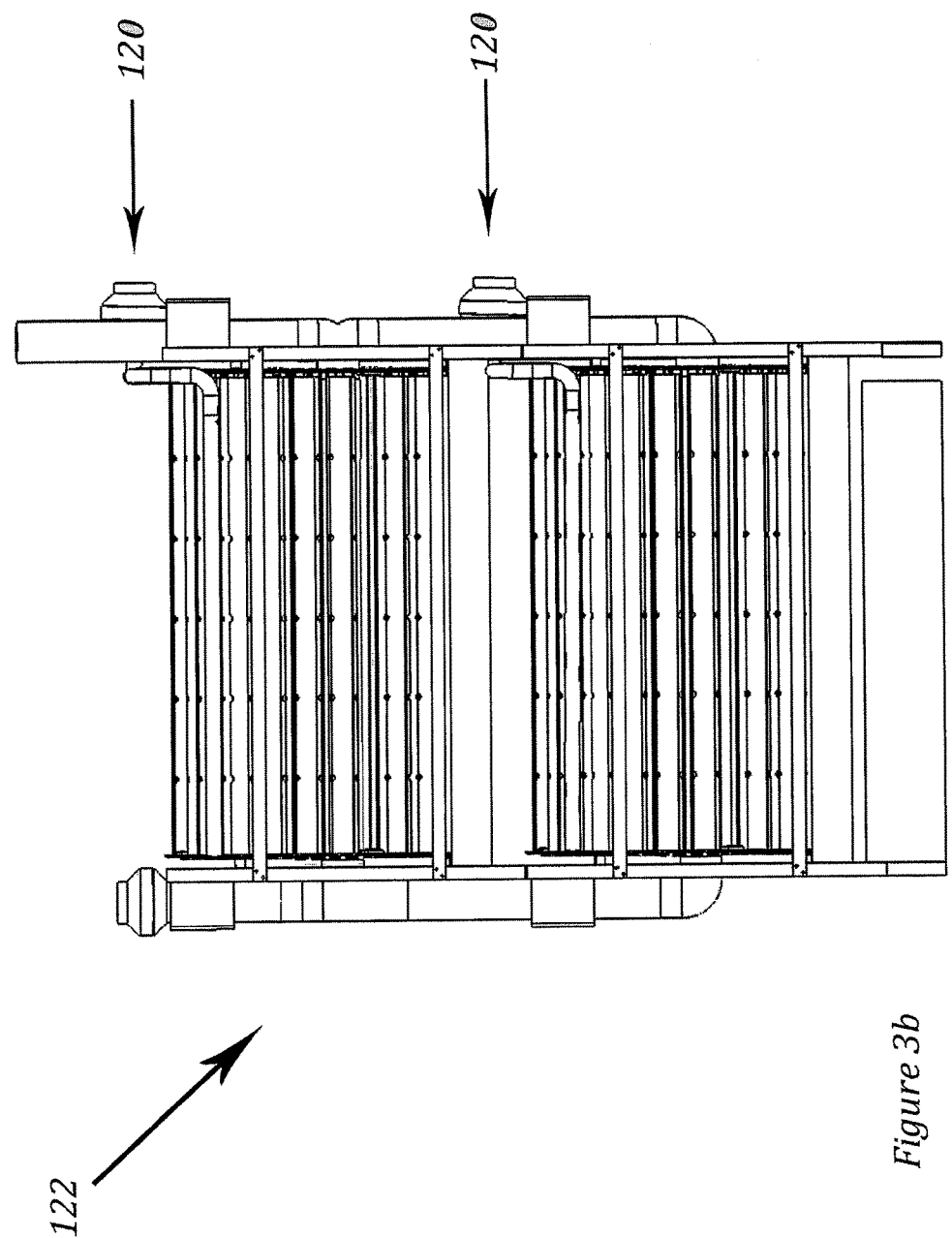
FIG. 3b is a side view of the stacked modular rotatable gardening system of FIG. 2.

The second side of a modular rotatable gardening system stacked on top of another modular rotatable gardening system is shown in FIG. 3b, and plants (not shown) can be loaded onto the trays 40 from the second side or the first side. Two or more modular rotatable gardening systems stacked on top of each other are referred to herein as a stacked modular rotatable gardening system 122. It is effective to grow one variety of plant in a single or stacked modular rotatable gardening system 122 since the nutrient is delivered to all the plants in the same concentration and timing. Trays can be made of PVC or other material which ideally doesn't rust, as with all the components since rust is a risk given the water delivery required for the plants.

Figure 4:
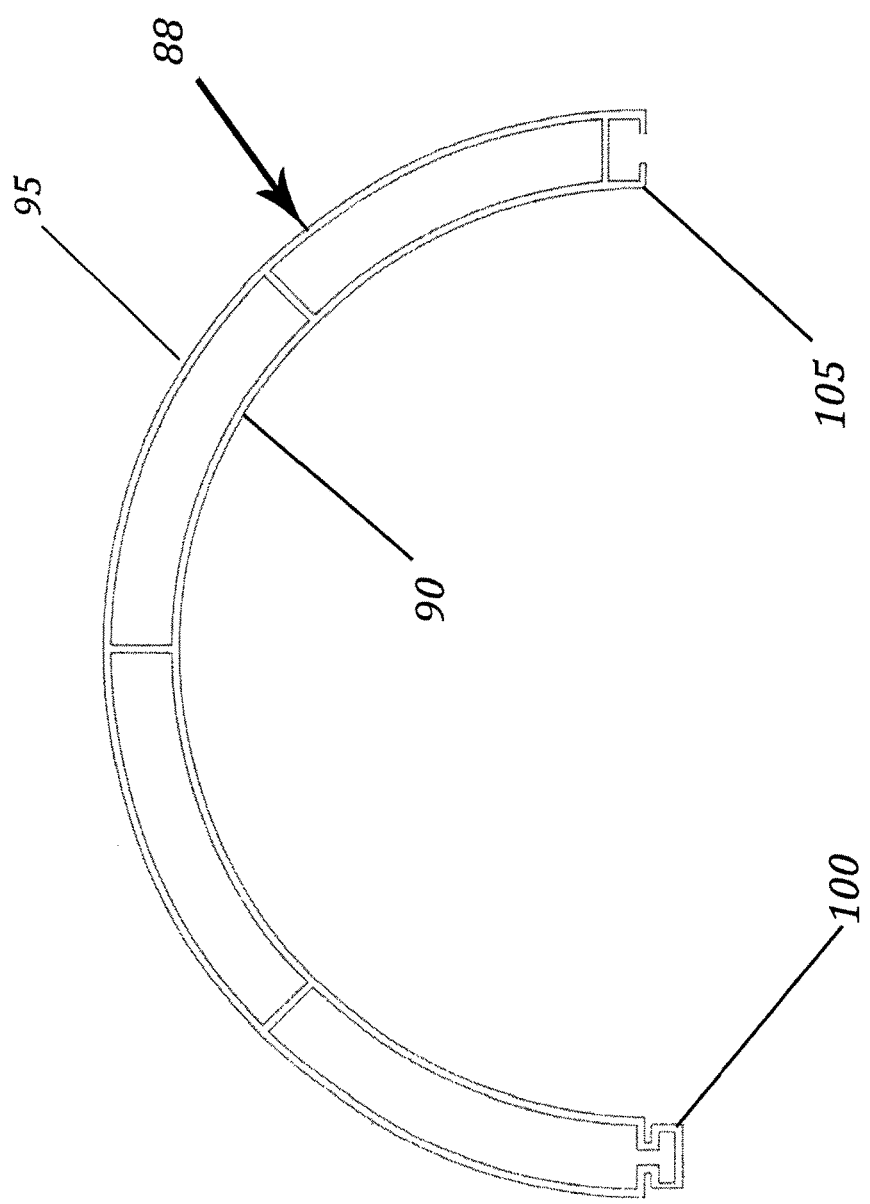
FIG. 4 is a cross-sectional view of one half of a modular air duct of an embodiment of the present invention.

As seen in FIG. 4, in addition to removing the hot air that radiates from the lights in the glass tube 45 the duct work in an embodiment of the invention may be enhanced to prevent heat from radiating from hot air passing through the ducts by the use of a stacked duct wall. Double wall duct component 88 comprises an inner wall 90 and outer wall 95. As such, this reduces the amount of heat that can be dissipated by the air ducts such that the hot air is released predominantly out of outlet 65 rather than along its path to outlet 65.

Additionally the duct work may be modular not only by duct sections which fit together to build the hot air removal system 42, but also the duct tube sections themselves as shown in FIG. 4 in which a semi-circular duct component is capable of snap together with another semi-circular duct component through inserting a male connector 100 into a female connector 105. The duct work in this embodiment of the invention may be made of PVC.

A T-duct 55 is shown in more detail in FIG. 5, in which the T-duct comprises a T-duct supporting section 110 which functions similarly to supporting air duct 50, and the T-duct section 115 shown as a semi-circular duct component (and the male connector 100 and female connector 105 are not shown in FIG. 5).

The modular rotatable gardening system 10 may additionally comprise a $CO_2$ delivery system 120 comprising an inline fan (not shown) with a split Y duct 125 from which piping 130 runs to each side of the system. The section of piping along the length of the growing trays 40 contains perforations 135 in order for the $CO_2$ to be released. The perforations 135 can be positioned to release $CO_2$ directly at the plants, and ideally to the underside of the plants' leaves. The split Y duct is positioned for aesthetic considerations in FIGS. 2a, 2b, 3a and 3b closer to the first side of the modular rotatable gardening system. In a stacked modular rotatable gardening system 122 shown in FIG. 3b, each system has its own $CO_2$ delivery system 120 to maximise the delivery of $CO_2$ to the plants.

Figure 7A:
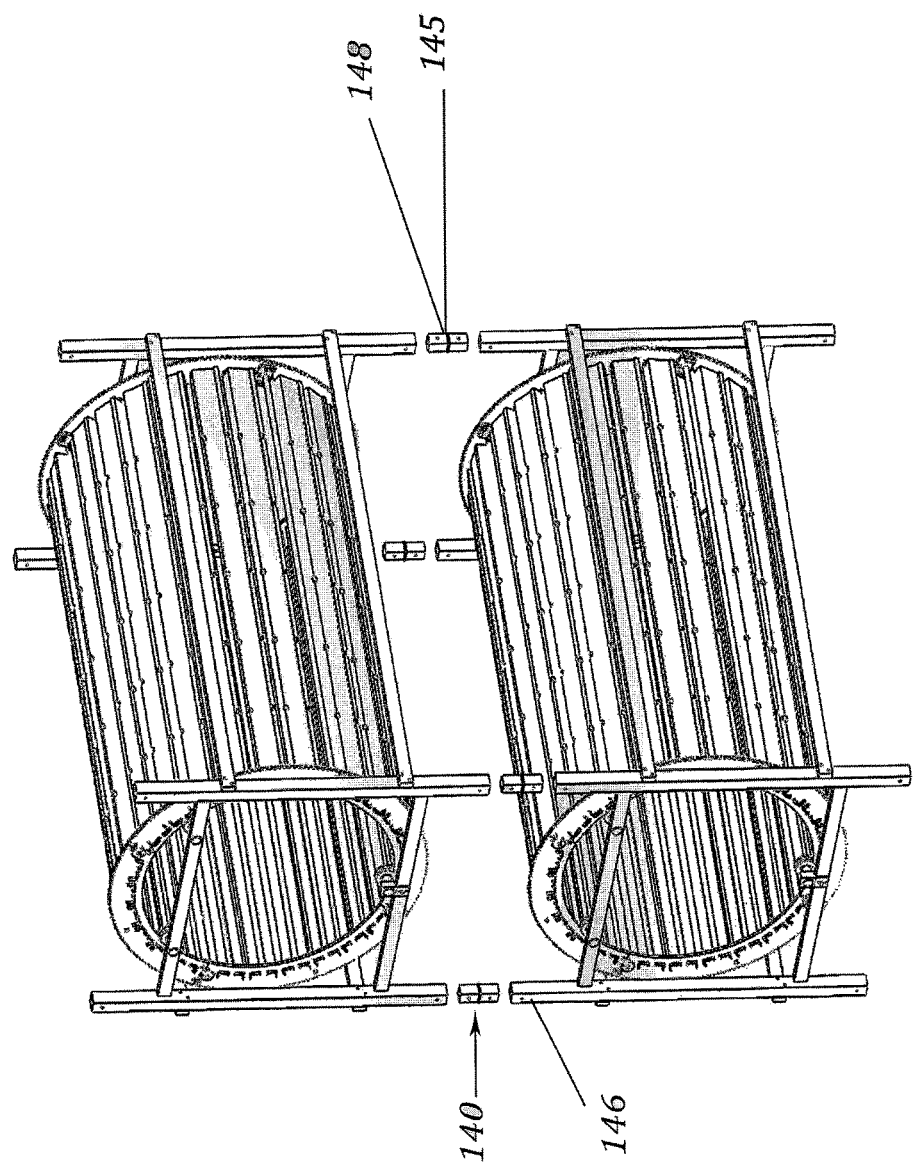

FIGS. 7a and 7b further shows the main frame 30 and drums 20 with sizing for an embodiment of the present invention, as well as demonstrating the attachment of the top of the main frame 30 of one modular rotatable gardening system to the bottom of another through main frame connectors 140. The main frame connectors 140 may have a lesser diameter than the main frame 30 except for a middle ledge 145, so that the top and bottom of the main frame connector 140 fits within the interior of the main frame. The upright 68 of the upper modular rotatable gardening system rests on the middle ledge 145 and the upright 68 of the lower modular rotatable gardening system abuts the middle ledge 45 when systems are stacked. The middle ledge 45 does not have to be in the middle, but the main frame connector 140 needs to be designed to provide enough stability and strength so that the uprights 68 stay aligned and hold the upper system. The main frame connectors 140 may be secured further via locking pins (not shown) which are placed through upright holes 146 on the uprights 68 into locking pin holes 148 when the upright holes 146 and locking pin holes 148 are aligned.

FIG. 7b also shows the possible locations of three attachment means 150 which suspends the drum 20 via the support ring 35 to the main frame 30 and more specifically to the first cross bar 70 and second cross bar 75. In this embodiment, the attachment means 150 is attached itself indirectly to the first cross bar 70 through an idler wheel support bracket 155 at about the center of the first cross bar 70, and the attachment means 150 are attached directly to the second cross bar 75 in two spots.

Figure 8:
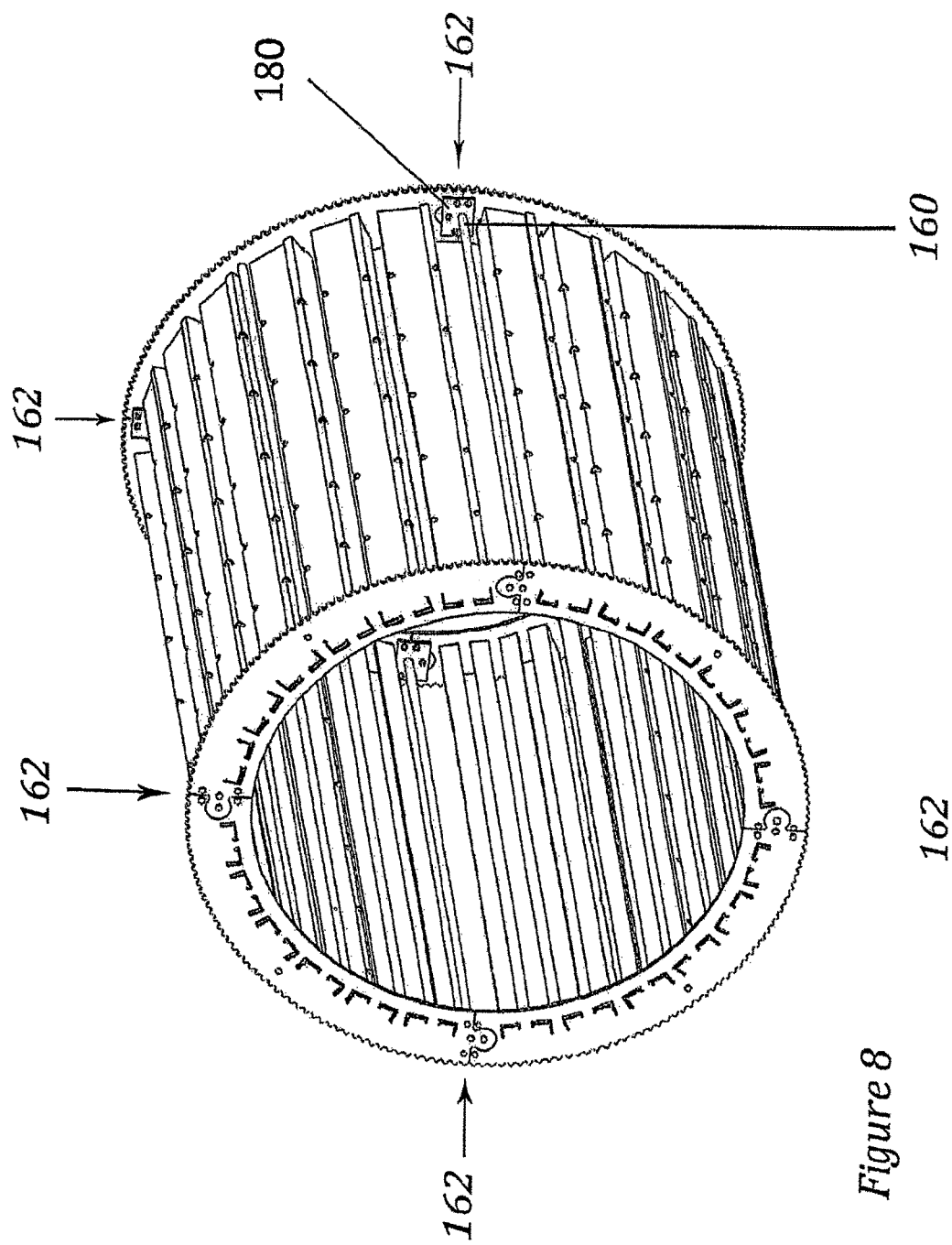
FIG. 8 is a perspective view of a drum of a modular rotatable gardening system of an embodiment of the present invention.
Figure 9:
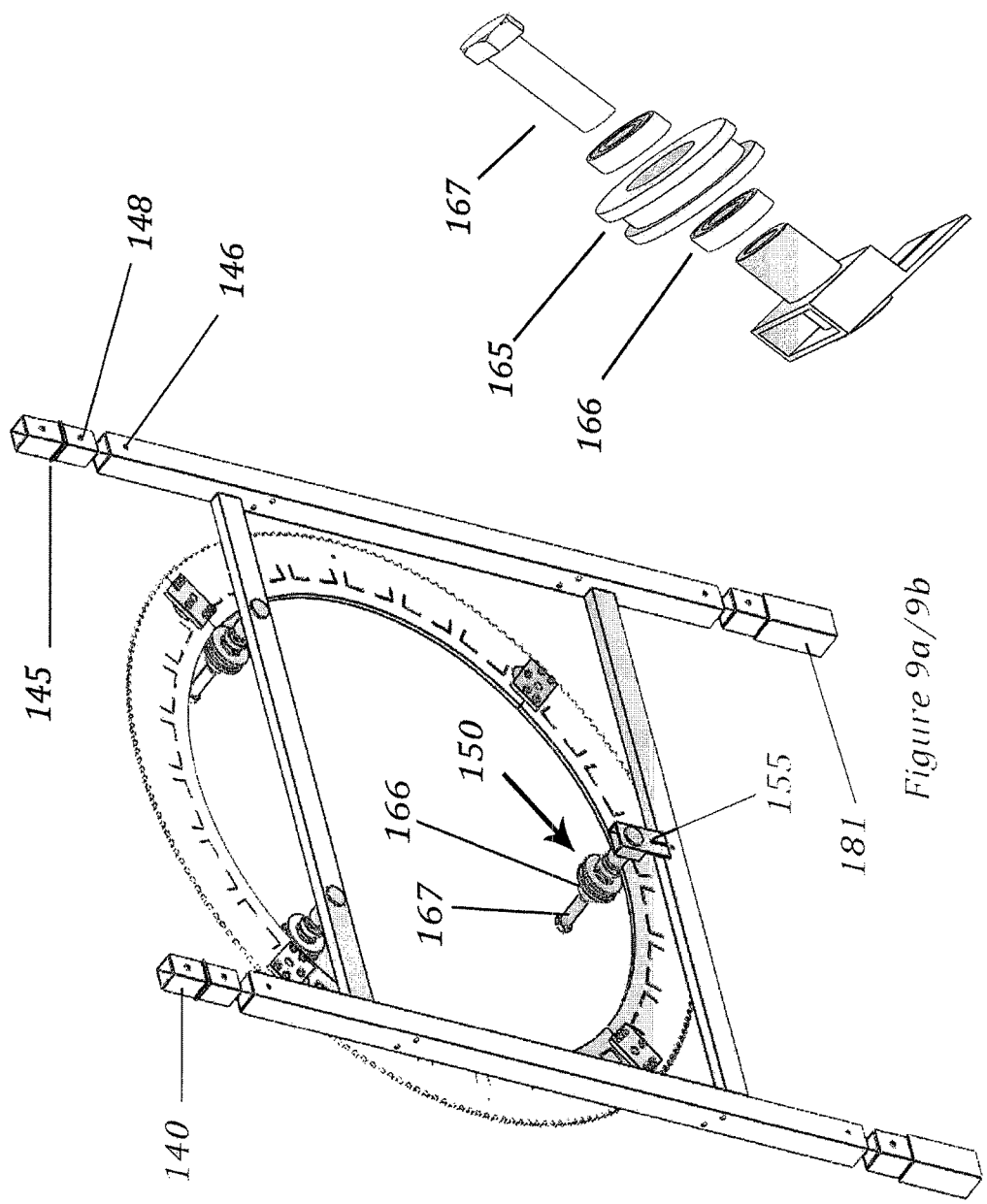
FIG. 9a is an exploded view of an attachment means of the support ring portion of a drum to a main frame of a modular rotatable gardening system of an embodiment of the present invention and FIG. 9b is an exploded view of the attachment means of FIG. 9b.

As shown in FIG. 8, the drum 20 in this embodiment has support rods 160 for stability. The support ring 35 in this embodiment of the invention is comprised of four pieces which snap together and these four junctures 162 are the location for the support rods 160 and connector blocks 180 as well. The support rods 160 can be aluminum, and a material to avoid rust and provide strength is desirable. The attachment means 150 are shown in further detail in FIGS. 9a and 9b, and as seen particularly in FIG. 9b, the attachment means 150 comprised of the idler wheel 165, with idler bearing 166, and support bolt 167, allows the drum 20 to rotate.

Figure 10:
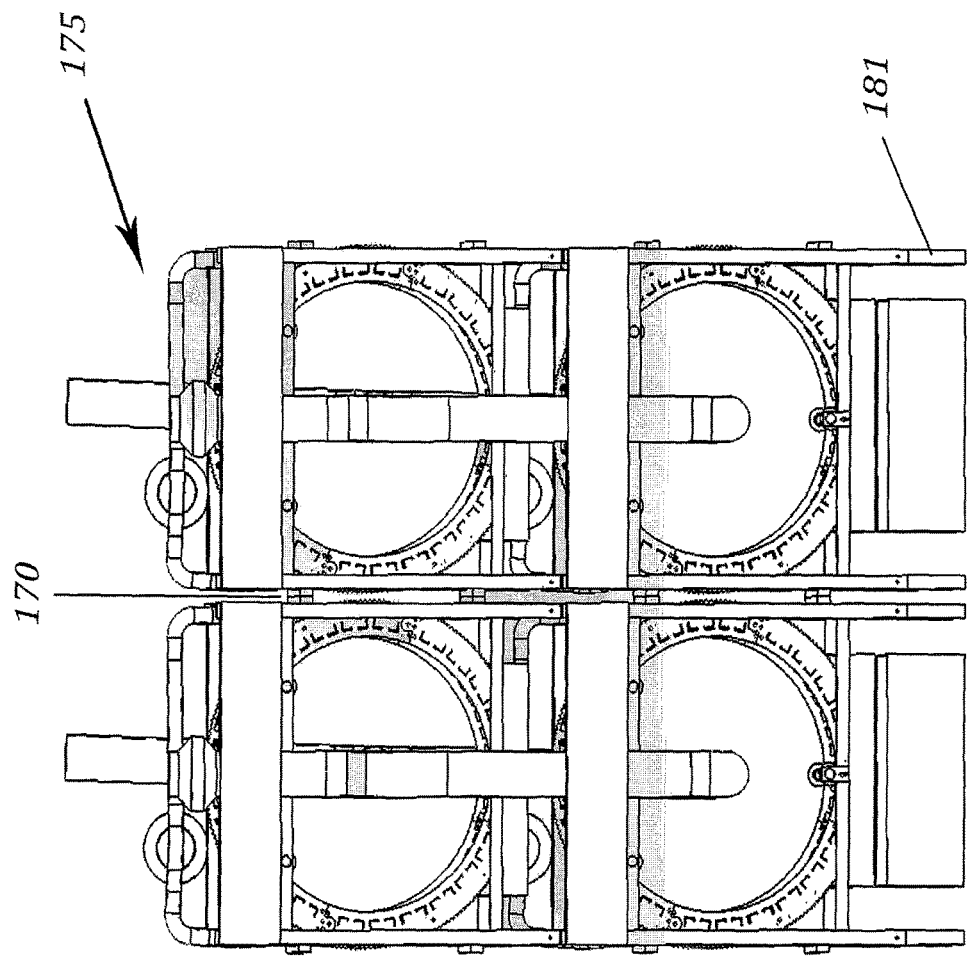
FIG. 10 is a perspective view of a first stacked modular rotatable gardening system beside a second stacked modular rotatable gardening system, in an embodiment of the present invention.

As shown in FIG. 10, in an embodiment of the invention, a modular rotatable gardening system stacked on another modular rotatable gardening system, referred to as a stacked modular rotatable gardening system is set beside a further stacked modular rotatable gardening system through a middle main frame attachment means 170 joining the respective uprights 68 in four spots. This middle main frame attachment means 170 can be a bolt to securely connect the two stacked modular rotatable gardening systems together. This in-line stacked modular rotatable gardening system 175 allows for plants to be loaded on and removed from the trays 40 from the outer sides of the in-line stacked modular rotatable gardening system 175. In a further embodiment, if more stacked modular rotatable gardening systems are set in-line, then the loading and unloading of plants from the middle systems will have to be adapted, for example, with different trays since they can't be unloaded from the sides unless the systems are detached from one another.

In a further embodiment, a modular rotatable gardening system is set beside a modular rotatable gardening system. Again, if more than two are set beside one another then the loading and unloading of plants from the middle systems will have to be adapted, for example, with different trays.

The growing lights may comprise four 600 W hps lamps and the electrical box 85 may include HID ballasts. Each electrical box 85 can be configured to power the two lamps that are nearest to that electrical box 85. A modular rotatable gardening system in an embodiment of the invention having three stacked systems with the hot air removal system 42 and $CO_2$ delivery system 120 can be made with the following dimensions: 48" width, 96" depth and 172" height. FIGS. 7a and 7b give an example of the size of main frame that can be utilised in an embodiment of the stacked modular rotatable gardening system.

From the above detailed description, the operation and construction of the invention should be apparent. While there are herein shown and described example embodiments of the invention, it is nevertheless understood that various changes may be made with respect thereto without departing from the principle and scope of the invention.

I claim:

1. A modular rotatable gardening system, comprising a drum in which plants can be grown, a modular main frame and a tubular hot air removal system holding lights to circulate air away from the lights, the tubular hot air removal system comprising a first tubular member held within the drum and extending from a first end of the drum to an opposing second end of the drum, and a second tubular member connected to an end of the first tubular member and extending substantially perpendicular to the first tubular member, wherein the lights are held in the first tubular member, and wherein the second tubular member includes an outlet port positioned above the drum, said drum suspended through a drum attachment arrangement within the modular main frame such that the drum is rotatable.

2. The modular rotatable gardening system of claim 1, additionally comprising a $CO_2$ delivery system to deliver $CO_2$ to the plants.

3. The modular rotatable gardening system of claim 1, wherein the lights comprise four HID lights with HID ballasts and two electrical boxes to hold the HID ballasts and to supply power to the lights.

4. A stacked modular rotatable gardening system comprising two or three modular rotatable gardening systems, each modular rotatable gardening system comprising a drum in which plants can be grown, a modular main frame and a tubular hot air removal system holding lights to circulate air away from the lights, the tubular hot air removal system comprising a first tubular member held within the drum and extending from a first end of the drum to an opposing second end of the drum, and a second tubular member connected to an end of the first tubular member and extending substantially perpendicular to the first tubular member, wherein the lights are held in the first tubular member, and wherein the second tubular member includes an outlet port positioned above the drum, said drum suspended through drum attachment arrangements within the modular main frame such that the drum is rotatable, the modular rotatable gardening systems stacked on top of each other from lower to higher, wherein each modular main frame comprises a top end and a bottom end, and the top end of the modular main frame of a lower modular rotatable gardening system is attached to the bottom end of the modular main frame of a higher modular rotatable gardening system.

5. An in-line stacked modular rotatable gardening system comprising a first stacked modular rotatable gardening system positioned beside a second stacked modular rotatable gardening system, wherein each stacked modular rotatable gardening system comprises two or three modular rotatable gardening systems, each modular rotatable gardening system comprising a drum in which plants can be grown, a modular main frame and a tubular hot air removal system holding lights to circulate air away from the lights, the tubular hot air removal system comprising a first tubular member held within the drum and extending from a first end of the drum to an opposing second end of the drum, and a second tubular member connected to an end of the first tubular member and extending substantially perpendicular to the first tubular member, wherein the lights are held in the first tubular member, and wherein the second tubular member includes an outlet port positioned above the drum, said drum suspended through a drum attachment arrangement within the modular main frame such that the drum is rotatable, the modular rotatable gardening systems stacked on top of each other from lower to higher, wherein each modular main frame comprises a top end and a bottom end, and the top end of the modular main frame of a lower modular rotatable gardening system is attached to the bottom end of the modular main frame of a higher modular rotatable gardening system, wherein the modular main frames of the first stacked modular rotatable gardening system are connected to the modular main frames of the second stacked modular rotatable gardening system.

6. An in-line modular rotatable gardening system comprising a first modular rotatable gardening system positioned beside a second modular rotatable gardening system, wherein each modular rotatable gardening system comprises a drum in which plants can be grown, a modular main frame, and a tubular hot air removal system holding lights to circulate air away from the lights, the tubular hot air removal system comprising a first tubular member held within the drum and extending from a first end of the drum to an opposing second end of the drum, and a second tubular member connected to an end of the first tubular member and extending substantially perpendicular to the first tubular member, wherein the lights are held in the first tubular member, and wherein the second tubular member includes an outlet port positioned above the drum, said drum suspended through a drum attachment arrangement within the modular main frame such that the drum is rotatable, wherein the modular main frame of the first modular rotatable gardening system is connected to the modular main frame of the second modular rotatable gardening system.

7. A modular rotatable gardening system comprising a cylindrical drum with open ends within which drum plants can be grown, a cylindrical support ring attached around each of the open ends, and a modular main frame to support the drum having two cross bars at each of the open ends, said drum suspended within the modular main frame through two ring attachment arrangements to one of the cross bars and one ring attachment arrangement to the other cross bar at each of the open ends, said ring attachment arrangement comprising an idler wheel on a support bracket, wherein the idler wheel rests on an inner circumferential surface of the support ring and the support bracket is attached to the cross bar such that the drum is rotatable; and, further comprising lights positioned inside the drum, and a tubular hot air removal system connected to the lights to circulate air away from the lights.

* * * * *